(12) United States Patent
Minamizawa (10) Patent No.: US 6,697,166 B1
(45) Date of Patent: Feb. 24, 2004

(54) IMAGE PROCESSING APPARATUS (75) Inventor: Fumihiro Minamizawa, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/256,761

(22) Filed: Feb. 24, 1999

(30) Foreign Application Priority Data

Feb. 26, 1998 (JP) ............................................. 10-045495

(51) Int. Cl.[7] ................................................. H04N 1/04
(52) U.S. Cl. ......................... 358/1.2; 358/474; 382/299
(58) Field of Search ................................. 358/448, 450, 358/451, 474, 1.2, 1.9; 382/298, 299

(56) References Cited

U.S. PATENT DOCUMENTS 5,521,640 A * 5/1996 Prater ........................ 348/273
5,719,686 A   2/1998 Sakamoto et al. .......... 358/444

* cited by examiner

Primary Examiner—Thomas D. Lee
(74) Attorney, Agent, or Firm—Oliff & Berridge, PLC (57) ABSTRACT A multifunction device, an example of the image processing apparatus, performs copy operation when a copy button is depressed. For the copy operation, an image reader unit reads image information from a document, and an ink jet printer unit records the read image information onto a recording sheet. The multi-function device further has CPUs for determining whether image information is to be read from a document as color data or monochrome data, and ROMs storing first default values that provide varying recording densities for copying the image information onto a recording sheet, in accordance with the result of determination by the CPUs. The CPUs also function to change the recording density for copying the image information onto a recording sheet, on the basis of the first default values stored in the ROMs. Therefore, the multi-function device is capable of automatically setting a suitable recording density for copying, in accordance with a currently set mode regarding the recording manner, the reading manner and the like.

20 Claims, 5 Drawing Sheets

IMAGE PROCESSING APPARATUS

BACKGROUND OF THE INVENTION

1. Field of Invention

The present invention relates to a copying apparatus for reading image information from a document and copying the image information onto a recording medium, a reading apparatus for reading image information from a document, and a recording apparatus for recording record data onto a recording medium.

2. Description of Related Art

Various multi-function devices have been proposed in which various functions including a reading function, a monochrome copy function, a color copy function, a facsimile function, a scanner function, a printer function, and the like, are incorporated into a single device body so that the device is able to perform any one of the functions.

To use such a multi-function device to copy image information from a document to a recording sheet in black and white or in colors, a user normally sets a suitable recording density, or the like, in accordance with a copy mode by operating a manual key, or the like, designated for setting the recording density, etc. The manual changing of such setting requires a cumbersome manual procedure.

SUMMARY OF THE INVENTION

Users of recording devices require different density settings and the like based on the type of recording that is being performed. For example, in the case of black-and-white copying, a user may desire to obtain a copied or recorded recording sheet as quickly as possible while accepting a certain reduction in recording density. This is because the black-and-white copy mode normally produces sufficiently clear outlines of a copy image on a recording sheet even at a low recording density. In the case of color copying, however, beautiful copy images may be desired. Thus, a user may wish to have a high recording density to obtain a high-density recorded copy image while accepting a certain reduction in recording speed. In the prior art devices, a user must manually operate various keys to set copying and recording parameters.

The present invention provides a copying apparatus capable of automatically setting a recording density for copy operation in accordance with, for example, a recording mode, a reading mode or the like, without requiring a user to perform a cumbersome manual operation. The invention also provides a reading apparatus capable of automatically setting a reading resolution for reading image information in accordance with, for example, a reading mode or the like, without requiring a user to perform a cumbersome manual operation. Additionally, the invention provides a recording apparatus capable of automatically setting a recording density for recording data onto a recording medium in accordance with, for example, a recording mode or the like, without requiring a user to perform a cumbersome manual operation.

According to one aspect of the invention, there is provided a copying apparatus for reading image information from a document and copying the image information onto a recording sheet. The copying apparatus includes a first determining device that determines whether the image information is to be read as color data or monochrome data The copying apparatus further includes a storage device that stores a first default value for varying a recording density for copying the image information onto the recording medium in accordance with a result of determination made by the first determining device, and a control device that changes the recording density used to copy the image information onto the recording medium on the basis of the first default value stored in the storage device.

In the copying apparatus, the first determining device determines whether image information is to be read from a document as color data or monochrome data Based on the result of determination made by the first determining device, the control device varies the recording density for copying the image information onto a recording medium by using the first default value stored in the storage device. The default value, which may also be termed a preset value, means a value or a setting that is automatically set when no specific value or setting is inputted by a user. The first default value is provided for varying the recording density for copying image information onto a recording medium.

Therefore, the copying apparatus automatically sets a suitable recording density in accordance with the mode or manner of the copying operation. For example, the copying apparatus sets the recording density based on whether image information is to be read from a document as color data or monochrome data Thus, a user does not need to set or change the recording density by operating a manual key, or the like. The copying apparatus thus eliminates the need for a user to perform a cumbersome manual procedure. The copying apparatus also allows a user, after a recording density is automatically set, to change the recording density or the like by operating a manual key or the like, if necessary.

In the above-described copying apparatus, the first default value may include a default value for color data and a default value for monochrome data. The control device may use the default value for color data to perform copying at a high recording density and may use the default value for monochrome data to perform copying at a low recording density.

Therefore, if the copying apparatus operates to perform monochrome copy based on the first default value, the control device uses the default value for monochrome data to perform copying at a low recording density, thereby giving a higher priority to the speed of copying operation. In the case of color copy, the control device uses the default value for color data to perform copying at a high recording density, thereby giving a higher priority to the recording quality of a produced copy. The "monochrome copy" generally means a black-and-white copy, but may also be a copy of a single color other than black and white.

According to another aspect of the invention, there is provided a copying apparatus for reading image information from a document and copying the read image information onto a recording sheet. The copying apparatus includes a second determining device that determines whether a multi-copy mode or a single copy mode is to be selected, a storage device that stores a second default value for varying a recording density for copying the image information onto the recording medium in accordance with a result of determination made by the second determining device, and a control device that changes the recording density used to copy the image information onto the recording medium on the basis of the second default value stored in the storage device.

In this copying apparatus, the second determining device determines whether the multi-copy mode or the single copy mode is to be selected. Based on the result of determination made by the second determining device, the control device varies the recording density for copying image information onto a recording medium by using the second default value stored in the storage device. Therefore, the copying apparatus automatically sets a suitable recording density in accordance with the mode or manner of copying operation. For example, the copying apparatus may set the recording density based on whether either the multi-copy mode or the single copy mode is selected. Thus, a user does not need to set or change the recording density by operating a manual key. The copying apparatus thus eliminates the need for a user to perform a cumbersome manual procedure.

Various methods can be employed to determine whether the multi-copy mode or the single copy mode is to be selected. For example, this determination may be accomplished by determining whether a user has instructed a single copy or a plurality of copies by using an operating key. Other methods are also possible.

The aforementioned second default value may include a default value for multi-copy and a default value for single copy. The control device may use the default value for single copy to perform copying at a high recording density, and may use the default value for multi-copy to perform copying at a low recording density.

Therefore, if the copying apparatus operates in the multi-copy mode based on the second default value, the control device uses the default value for multi-copy to perform copying at a low recording density, thereby giving a higher priority to the speed of copying operation. In the single copy mode, the control device uses the default value for single copy to perform copying at a high recording density, thereby giving a higher priority to the recording quality of a produced copy. The copying apparatuses described above as different aspects of the invention may be combined in any manner.

According to still another aspect of the invention, there is provided a reading apparatus for reading image information from a document at a reading resolution. The reading apparatus includes a first read determining device that determines whether the image information is to be read as color data or monochrome data, a storage device that stores a third default value for varying a reading resolution for reading the image information in accordance with a result of determination made by the first read determining device, and a control device that changes the reading resolution used to read the image information on the basis of the third default value stored in the storage device.

In the reading apparatus, the first read determining device determines whether image information is to be read from a document as color data or monochrome data Based on the result of determination made by the first read determining device, the control device varies the reading resolution for reading the image information by using the third default value stored in the storage device.

The reading apparatus automatically sets a suitable reading resolution in accordance with the mode or manner of reading operation, for example, whether image information is to be read from a document as color data or monochrome data. Thus, a user does not need to set or change the reading resolution, or the like, by operating a manual key. The reading apparatus thus eliminates the need for a user to perform a cumbersome manual procedure. The reading apparatus also allows a user, after a reading resolution is automatically set, to change the reading resolution, or the like, by operating a key, for example.

The third default value may include a default value for color data and a default value for monochrome data. The control device may use the default value for color data to read at a high reading resolution and may use the default value for monochrome data to read at a low reading resolution.

Thus, if the reading apparatus operates to perform a reading operation based on the third default value to read monochrome data, the control device uses the default value for monochrome data to perform reading at a low reading resolution, thereby giving a higher priority to the speed of reading operation. In the case of color data, the control device uses the default value for color data to perform reading at a high reading resolution, thereby giving a higher priority to the quality of image information read. The "monochrome reading" generally means the reading an image as black-and-white data, but may also be the reading an image as data of a single color other than black and white, if necessary.

According to a further aspect of the invention, there is provided a reading apparatus for reading image information from a document at a reading resolution, including a second read determining device that determines whether a multi-reading mode or a single reading mode is selected. The reading apparatus further includes a storage device that stores a fourth default value for varying a reading resolution for reading the image information in accordance with a result of determination made by the second read determining device and a control device that changes the reading resolution used to read the image information on the basis of the fourth default value stored in the storage device.

In this reading apparatus, the second read determining device determines whether the multi-reading mode or the single reading mode is to be selected. Based on the result of determination made by the second read determining device, the control device varies the reading resolution for reading image information by using the fourth default value stored in the storage device.

The reading apparatus automatically sets a suitable reading resolution in accordance with the mode or manner of reading operation. For example, the reading apparatus sets the reading resolution in accordance with whether the multi-reading mode or the single reading mode is selected. Thus, a user does not need to set or change the reading resolution by operating a manual key. The reading apparatus thus eliminates the need for a user to perform a cumbersome manual procedure.

Various methods can be employed to determine whether the multi-reading mode or the single reading mode is selected. For example, this determination may be accomplished by determining whether a user has instructed the reading of a single document or a plurality of documents by using an operating key. Other methods are also possible.

The fourth default value may include a default value for multi-reading and a default value for single reading. The control device may use the default value for multi-reading to read at a low reading resolution and may use the default value for single reading to read at a high reading resolution.

Therefore, if the reading apparatus operates in the multi-reading mode based on the fourth default value, the control device uses the default value for multi-reading to perform reading at a low reading resolution, thereby giving a higher priority to the speed of reading operation. In the single reading mode, the control device uses the default value for single reading to perform reading at a high reading resolution, thereby giving a higher priority to the quality of read image information. The reading apparatuses described above as different aspects of the invention may be combined in any manner.

According to a still further aspect of the invention, there is provided a recording apparatus for recording record data onto a recording sheet at a recording density. The recording apparatus includes a first record determining device that determines whether the record data is color data or monochrome data, a storage device that stores a fifth default value for varying a recording density for recording the record data in accordance with a result of determination made by the first record determining device, and a control device that changes the recording density used to record the record data on the basis of the fifth default value stored in the storage device.

In the recording apparatus, the first record determining device determines whether record data is to be recorded as color data or monochrome data. Based on the result of determination made by the first record determining device, the control device varies the recording density for recording the record data (e.g., image information) onto a recording medium by using the fifth default value stored in the storage device.

Thus, the recording apparatus automatically sets a suitable recording density in accordance with the mode or manner of recording operation. For example, the recording apparatus sets a recording density based on whether record data is to be recorded as color data or monochrome data. Thus, a user does not need to set or change the recording density by operating a manual key. The recording apparatus thus eliminates the need for a user to perform a cumbersome manual procedure. The recording apparatus also allows a user, after a recording density is automatically set, to change the recording density, or the like. The "monochrome data" generally means black-and-white data, but may also be data of a single color other than black and white.

The fifth default value may include a default value for color data and a default value for monochrome data The control device may use the default value for color data to record the record data at a high recording density and may use the default value for monochrome data to record the record data at a low recording density.

Therefore, if the recording apparatus operates to perform recording operation based on the fifth default value to record monochrome data, the control device uses the default value for monochrome data to perform recording at a low recording density, thereby giving a higher priority to the speed of recording operation. In the case of color data, the control device uses the default value for color data to perform recording at a high recording density, thereby giving a higher priority to the recording quality.

According to a further aspect of the invention, there is provided a recording apparatus for recording record data onto a recording sheet at a recording density, including a second record determining device that determines whether a multi-recording mode or a single recording mode is to be selected, a storage device that stores a sixth default value for varying a recording density for recording the record data in accordance with a result of determination made by the second record determining device, and a control device that changes the recording density used to record the record data on the basis of the sixth default value stored in the storage device.

In this recording apparatus, the second record determining device determines whether the multi-recording mode or the single recording mode is to be selected. Based on the result of determination made by the second record determining device, the control device varies the recording density for recording the record data (e.g., image information), by using the sixth default value stored in the storage device.

Therefore, the recording apparatus automatically sets a suitable recording density in accordance with the mode or manner of recording operation. For example, the reading apparatus sets a recording density based on whether the multi-recording mode or the single recording mode is selected. Thus, a user does not need to set or change the recording density by operating a manual key. The recording apparatus thus eliminates the need for a user to perform a cumbersome manual procedure.

Various methods can be employed to determine whether the multi-recording mode or the single recording mode is selected. For example, this determination may be accomplished by determining whether a user has instructed a single recording medium (e.g., single recording sheet) or a plurality of recording media (e.g., recording sheets) by using an operating key. Other methods are also possible.

The sixth default value may include a default value for multi-recording and a default value for single recording. The control device my use the default value for single recording to record the record data at a high recording density and may use the default value for multi-recording to record the record data at a low recording density.

Therefore, if the recording apparatus operates in the multi-recording mode based on the sixth default value, the control device uses the default value for multi-recording to perform recording at a low recording density, thereby giving a higher priority to the speed of recording operation. In the single recording mode, the control device uses the default value for single recording to perform recording at a high recording density, thereby giving a higher priority to the recording quality. The recording apparatuses described above as different aspects of the invention may be combined in any manner.

Furthermore, according to the invention, there may be provided a multi-function device that has all or any combination of the functions of the copying apparatuses, the reading apparatuses and the recording apparatuses described above.

BRIEF DESCRIPTION OF THE DRAWINGS

Preferred embodiments of the present invention will be described in detail with reference to the following figures, where like numerals designate like elements, and wherein.

DETAILED DESCRIPTION OF PREFERRED EMBODIMENTS

Figure 1:
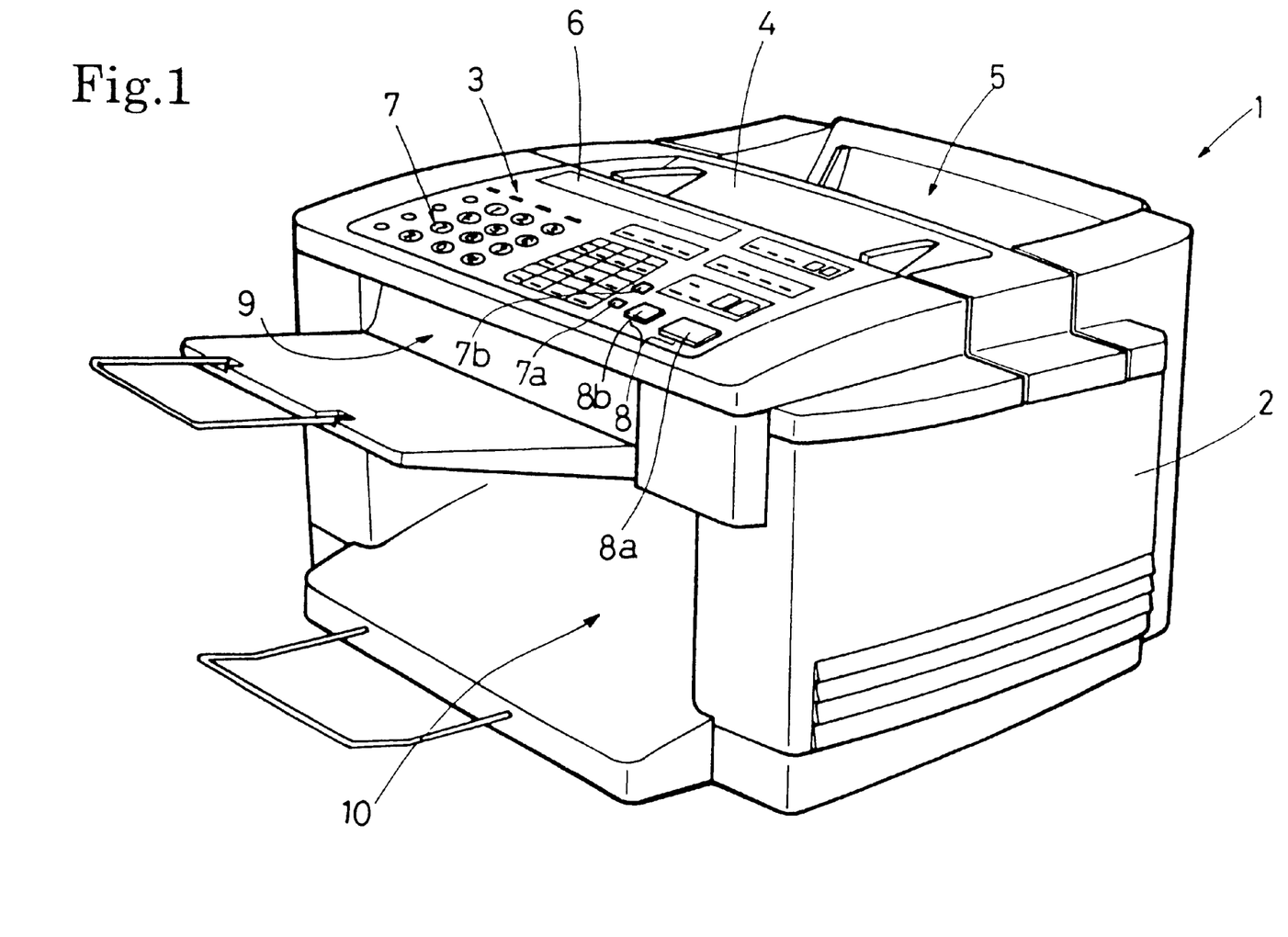
FIG. 1 is an exemplary perspective view of a multi-function device according to an embodiment of the invention.

FIG. 1 is an exemplary perspective view of a multi-function device 1 according to the embodiment. The multi-function device 1 has various functions including, for example, an image reader function, a printer function, a monochrome copy function and a color copy function and, furthermore, a facsimile receiving function, a telephone function, and the like.

Referring to FIG. 1, the multi-function device 1 (hereinafter, referred to as "device 1") has a device body 2.

In an upper surface of the device body 2, an operating panel 3 is provided in a forward portion, and a document setting portion 4 is formed substantially at the center. Formed in a rearward portion of the upper surface of the device body 2 is a cassette insert portion 5 that receives therein a sheet cassette (not shown) containing a stack of recording sheets, i.e., recording medium sheets.

The operating panel 3 has a display 6 in an upper portion thereof The display 6 may be a liquid crystal display (LCD), cathode ray tube (CRT), flat panel display, touch screen display, or the like. The display 6 displays various messages, for example, a telephone number during performance of the facsimile function, operation instruction messages during performance of the monochrome or black-and-white copy function, the color copy function, the reader function, the printer function and the like, and other messages suitable for particular situations.

Numerical buttons 7 of "0" to "9" and other buttons and keys are arranged below the display 6, that is, forward of the display 6 (to the left of the display 6 in FIG. 1). The numerical buttons 7 are used to input a telephone number for the facsimile function, the number of copies for the copy function, and the like. Disposed to the right of the numerical buttons 7 is a start key 7a that is operated for facsimile transmission or the like. Disposed above or rearward of the start key 7a is a color instruction key 7b for instructing whether image information is to be read from a document as color data or monochrome data at the time of facsimile transmission or the like.

Copy buttons 8, more specifically, a monochrome copy button 8a and a color copy button 8b, are arranged side by side in a lower (forward) right portion of the operating panel 3. When either one of the copy buttons 8 is depressed, the liquid crystal display 6 displays a message "INPUT NUMBER OF COPIES". A desired number of copies can be inputted by using corresponding one or more of the numerical buttons 7 when the message is displayed. If the input number of copies is two or greater, a multi-copy mode is automatically selected. If the input number of copies is one, a single copy mode is automatically selected.

The document setting portion 4 is used to set documents for facsimile transmission or documents to be copied. A document is conveyed from the document setting portion 4 into the device body 2. After image information is read from the document by an image reader unit 21 (see FIGS. 2 and 3), the document is discharged onto a document discharge portion 9 that is formed in a forward portion of the device body 2. The image information read by the image reader unit 21 is recorded on a recording sheet fed from a sheet cassette inserted in the cassette insert portion 5, by an ink jet printer unit 37 (see FIGS. 2 and 3).

After the image information is recorded on a recording sheet, the recording sheet is discharged onto a recording sheet discharge portion 10 that is formed below the document discharge portion 9. The sheet cassette insertable into the cassette insert portion 5 is capable of containing recording sheets of different sizes, for example, letter size sheets, A4-size sheets, B5-size sheets, and the like. The recording sheet discharge portion 10 receives recording sheets of different sizes conveyed through a conveyance path 47 indicated in FIG. 2.

A document is conveyed from the document setting portion 4 to the document discharge portion 9 along a passage extending in the device body 2 of the device 1, that is, a guide passage 11 extending below the operating panel 3. Disposed along the guide passage 11, below the operating panel 3, are a document separating roller 12 and a separator piece 13 that faces and contacts the document separating roller 12. Disposed downstream of the document separating roller 12 are a pair of upper and lower guide rollers 14. Disposed downstream of the guide rollers 14 are another pair of upper and lower guide rollers 15.

Therefore, documents stacked on the document setting portion 4 are separately fed one at a time by the document separating roller 12 and the separator piece 13, and conveyed downstream by the guide rollers 14, 15 while receiving a tension due to the guide rollers 14, 15. While being conveyed in this manner, each document is read by the image reader unit 21 at a reading position 16 that is defined between the guide rollers 14 and the guide rollers 15.

Figure 2:
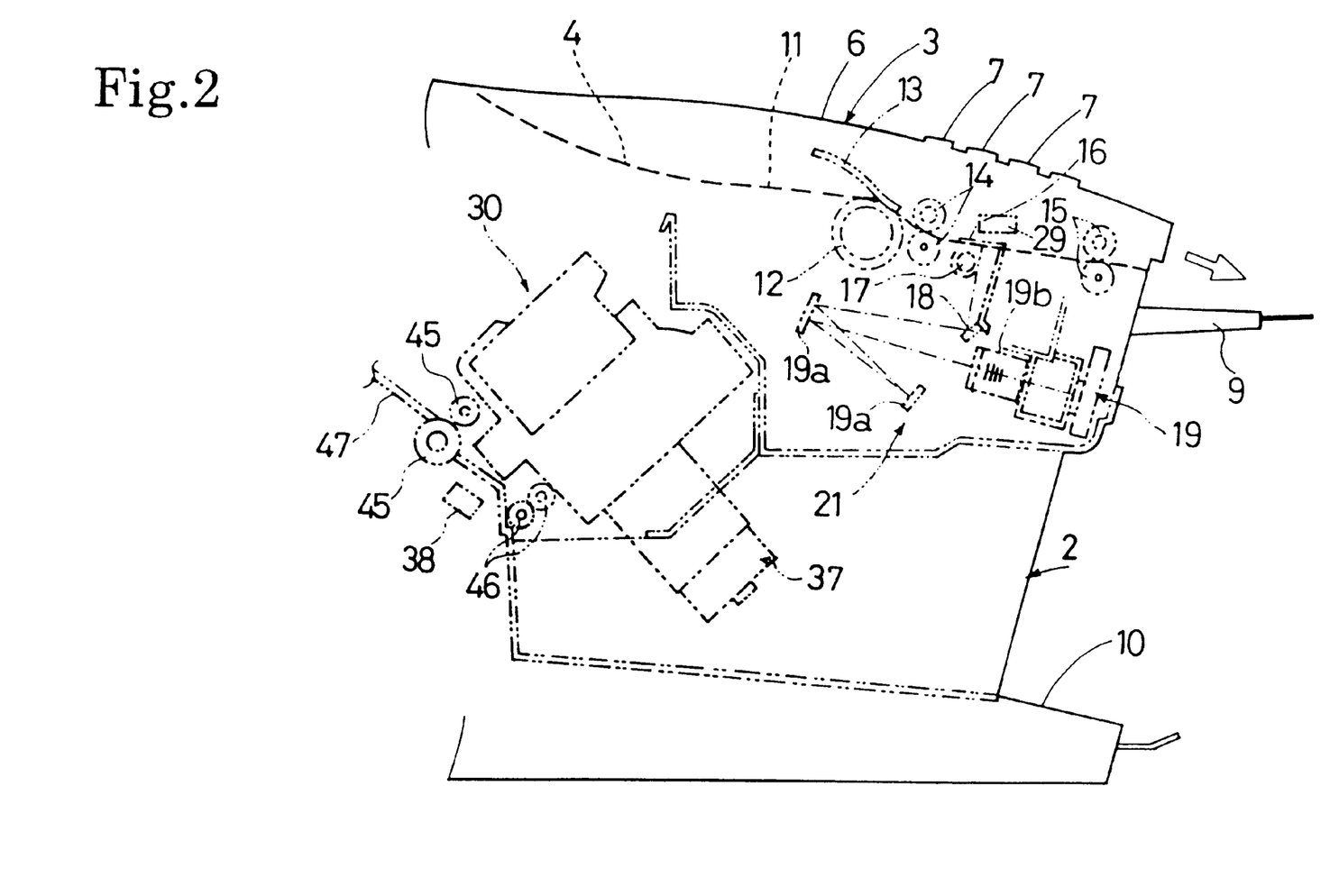
FIG. 2 is an exemplary schematic partial side view of the interior of the multi-function device shown in FIG. 1.

The image reader unit 21 is disposed below the reading position 16 in the device 1 as shown in FIG. 2. The image reader unit 21 is constructed as follows. A lamp device 17 for selectively emitting red light, green light and blue light is disposed below the reading position 16. A reflecting mirror 18 for reflecting light reflected from a document is disposed directly under the reading position 16. Light reflected from the reflecting mirror 18 is led to a CCD unit 19 via a plurality of reflecting mirrors 19a, an optical lens 19b, and the like. The CCD unit 19 has a photoelectric conversion device generally termed "charge coupled device (CCD)"The CCD unit 19 transfers accumulated charges to a signal line (not shown) synchronously with clock signals transmitted to the CCD unit 19 via another signal line (not shown). The transferred charges are processed as image information under the control by a CPU 26 described below.

A document sensor 29 for detecting a document is disposed near the reading position 16. The document sensor 29 is formed of, for example, a photo-coupler and a photo-interrupter that is turned by a leading or tailing edge of each document conveyed. Each document is detected by the photo-coupler detecting light transmission or light interruption caused by the photo-interrupter. When a document conveyed by the guide rollers 14 is detected by the document sensor 29, it is determined that the document is present at the detecting position.

A printer section 30 is provided rearward of the image reader unit 21 in the device body 2. The printer section 30 includes the ink jet printer unit 37 capable of recording color or monochrome image information or record data onto a recording sheet conveyed from the sheet cassette. The printer section 30 may be formed of a generally-termed serial print type printer. Therefore, the printer section 30 prints image information or record data by a serial method. That is, the ink jet printer unit 37 records one line of image data onto a recording sheet while moving in a right-to-left direction relative to the device body 2a. After the recording of the line is completed, the recording sheet is conveyed by an amount corresponding to one recording line, so that the inkjet printer unit 37 records the next line of image information or record data.

More specifically, a recording sheet fed from the sheet cassette is conveyed downstream toward the recording sheet discharge portion 10, along the conveyance path 47 in the device body 2 indicated in FIG. 2, by a pair of guide rollers 45 and another pair of guide rollers 46 disposed downstream of the guide rollers 45. While a recording sheet is conveyed with a tension applied thereto by the guide rollers 45 and the guide rollers 46, the ink jet printer unit 37 performs recording on the recording sheet at a recording position defined between the guide rollers 45 and the guide rollers 46. After the recording process, the recording sheet is discharged onto the recording sheet discharge portion 10 provided below the document discharge portion 9.

A recording sheet sensor 38 for detecting a recording sheet is disposed near the recording position of the inkjet printer unit 37. The recording sheet sensor 38 is formed of, for example, a photo-coupler and a photo-interrupter that is turned by each recording sheet conveyed, and detects each recording sheet by the photo-coupler detecting light transmission or light interruption caused by the photo-interrupter. When a recording sheet conveyed by the guide rollers 45 is detected by the recording sheet sensor 38, it is determined that the recording sheet is present at the detecting position.

The above configuration is only illustrative and is not meant to be limiting in any way. Other configurations of the above elements may be used without departing from the spirit and scope of the present invention.

Figure 3:
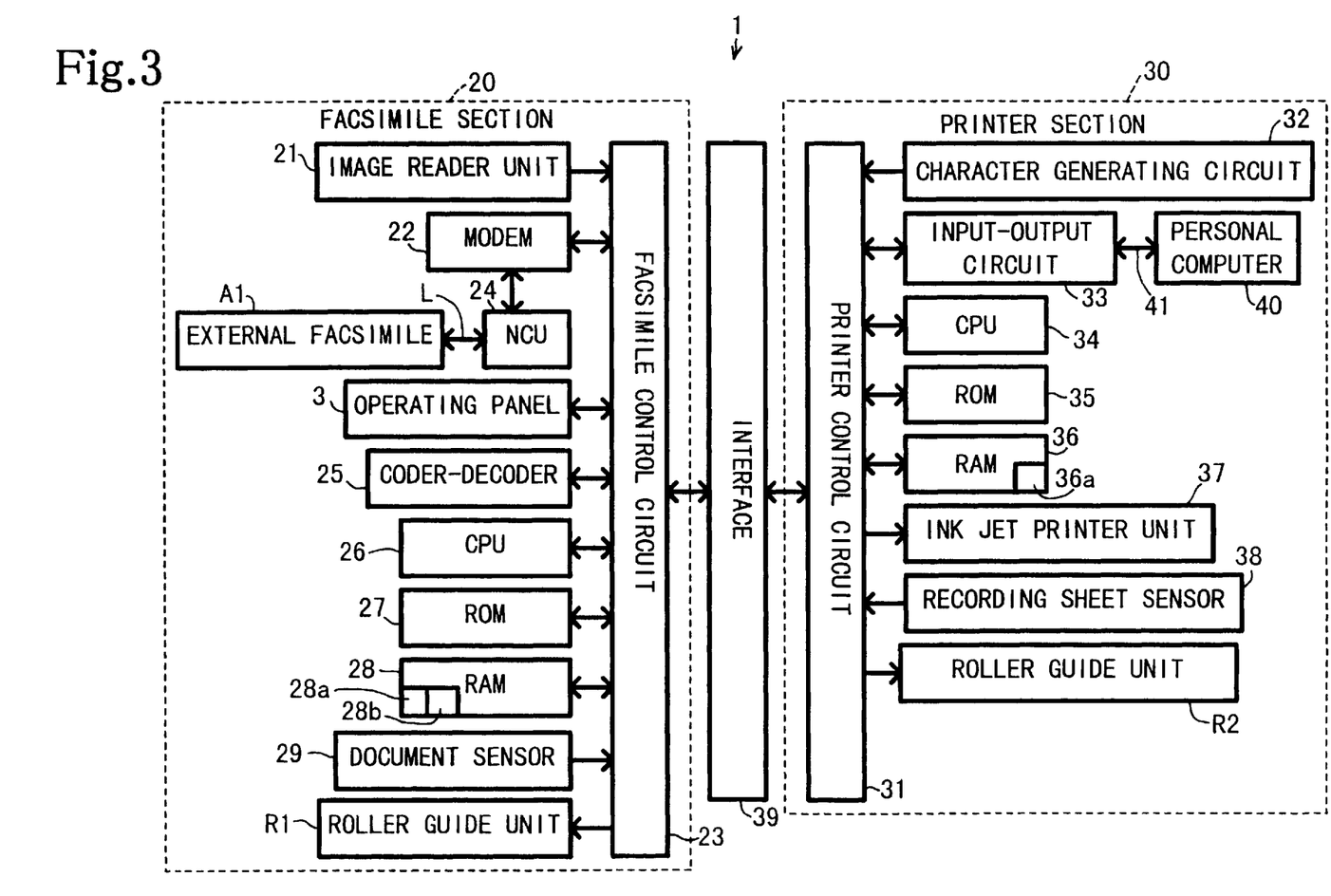
FIG. 3 is an exemplary block diagram of a control system of the multi-function device.

A control system of the above-described device 1 will now be described with reference to FIG. 3. FIG. 3 is an exemplary block diagram of the control system of the device 1. As shown in FIG. 3, the device 1 is formed mainly of a facsimile section 20 and the printer section 30. Provided between the facsimile section 20 and the printer section 30 is an interface 39 that enables transmission of signals, data and the like therebetween.

The facsimile section 20 is designed to realize the reading operation for the copy function, the facsimile transmitting and receiving function, and the like. The facsimile section 20 includes a facsimile control circuit 23, the image reader unit 21 provided as a reader unit, a modem 22, a network control unit (NCU) 24, a coder-decoder 25, the CPU 26, a ROM 27, a RAM 28, and the like. The facsimile control circuit 23, controlled by the CPU 26, controls the image reader unit 21 and the like in order to realize the facsimile functions. The modem 22 transmits image data to an external facsimile A1 and receives image data therefrom, via the NCU 24 and a network formed by a wired or wireless communication link L, or the like. The NCU 24 is a device for performing various operations, for example, transmitting dial signals to a telephone network or responding to a call signal from the telephone network. The coder-decoder 25 codes image information read by the image reader unit 21 for transmission thereof to the facsimile A1, and decodes data received from the facsimile A1 for the recording thereof The CPU 26 executes various programs and the like necessary to perform the copy function and various other functions of the facsimile apparatus, and controls the entire facsimile section 20. The ROM 27 is a memory storing various programs, and the like, necessary to control the facsimile section 20. The RAM 28 is a memory for temporarily storing data received from the facsimile A1, image information read by the image reader unit 21, various data calculated or processed by the CPU 26, and the like. Therefore, in a system construction where image information read by the image reader unit 21 is stored into a storage, the read image information is stored into the RAM 28. The facsimile control circuit 23 is connected to the operating panel 3, the document sensor 29, and a roller guide unit R1 provided as a document conveying device for driving the guide rollers 14, 15.

The printer section 30 is designed to realize the copy function and various printer functions including a video printer function, a function for recording facsimile-received data, and the like. The printer section 30 includes a printer control circuit 31, a character generating circuit (CG) 32, an input-output circuit (I/O) 33, a CPU 34, a ROM 35, a RAM 36, an ink jet printer unit 37 provided as a recorder unit, and the like. The printer control circuit 31 controls the ink jet printer unit 37, and the like, in order to realize the printer functions. The character generating circuit 32 converts the content of data transmitted from a personal computer 40 into character data for recording. For example, a character code included in the data from the personal computer 40 corresponds to "A", the character generating circuit 32 converts the character code into bit image data such that an image of "A" is formed on a recording sheet. The input-output circuit 33 transmits data to the personal computer 40 and receives data therefrom, via a cable 41.

The CPU 34 controls the printer section 30 in accordance with a printer control program stored in the ROM 35, and temporarily stores various data calculated or processed during the control into the RAM 36. The ink jet printer unit 37, provided as a recorder unit, records characters and the like on a recording sheet by ejecting ink droplets to the recording sheet selectively from ink ejection pores formed in an ink jet head. The printer control circuit 31 is connected to a roller guide unit R2 for rotating the guide rollers 45, 46, and to the recording sheet sensor 38.

An example of the copy operation performed by the device 1 will next be described. The copy function is realized by the cooperation of the facsimile section 20 and the printer section 30. After a document fed from the document setting portion 4 is set at the reading position 16 and a recording sheet fed from a sheet cassette is set at the recording position, the document is conveyed toward the document discharge portion 9 by an amount corresponding to one line at a time while image information on the document is read by the image reader unit 21. Subsequently, the read image information is transmitted from the facsimile section 20 to the printer section 30 under control by the CPU 26. Based on the received image information, the CPU 34 of the printer section 30 controls the ink jet printer unit 37. The ink jet printer unit 37 records the image information onto the recording sheet conveyed from the sheet cassette under control by the CPU 34. The copy operation is thus performed. For the copy operation, the CPU 26 and the CPU 34 cooperate as described above.

The relationship between image information inputted by the image reader unit 21 and the reading resolution will be explained. Normally, if the reading resolution is high, the entire image read can be beautifully reproduced with fine details. However, since one piece of image information corresponds to one pixel, an increase in reading resolution results in an increase in the amount of image information, thereby increasing the required memory capacity for storing image information. Furthermore, an increase in reading resolution increases the time required for the reading operation. Conversely, if the reading resolution is reduced, details of the entire image read cannot be reproduced, that is, image quality deteriorates, but the memory capacity needed to store image information and the time needed for the reading operation are reduced.

The reading resolution in a sub-scanning direction is determined in accordance with a relationship between the amount of document conveyance to the reading position 16 in the sub-scanning direction and the reading timing of the image reader unit 21, as follows. For example, if 300 pixels are to be read for every inch, the image reader unit 21 performs reading every time the document is conveyed a distance equal to a three-hundredth of 1 inch (about 0.08 mm). If 200 pixels are to be read for every inch, the image reader unit 21 performs reading every time the document is conveyed a distance equal to a two-hundredth of 1 inch (about 0.12 mm). Thus, as the amount of document conveyance in the subscanning direction for image reading decreases, the number of pixels read per inch increases, that is, the reading resolution increases. As the amount of document conveyance in the subscanning direction for image reading increases, the number of pixels read per inch decreases, that is, the reading resolution decreases.

In this embodiment, the CPU 26 controls the rotation of the guide rollers 14, 15. Therefore, the reading resolution in the sub-scanning direction can be changed by the CPU 26 controlling the reading timing of the image reader unit 21 while controlling the rotation of the guide rollers 14, 15.

The reading resolution in the main scanning direction can be changed by adjusting a control signal to the CCD unit 19. More specifically, the reading resolution in the main scanning direction increases if the control signal applied to the CCD unit 19 is adjusted in such a manner as to increase the number of pixels extracted from the CCD unit 19 for each line in the main scanning direction. The reading resolution in the main scanning decreases if the control signal applied to the CCD unit 19 is adjusted in such a manner as to reduce the number of pixels extracted from the CCD unit 19 for each line in the main scanning direction.

Therefore, through the above-described control, the reading resolution in the main scanning direction and the sub-scanning direction can be changed. For example, the reading resolution of 360×360 pixels (the number of pixels in the main scanning direction×the number of pixels in the sub-scanning direction) per square inch is higher than the reading resolution of 200×200 pixels (the number of pixels in the main scanning direction×the number of pixels in the sub-scanning direction) per square inch.

The relationship between the record data and the recording density in the recording operation of the ink jet printer unit 37 (that is, a recorder unit) will next be explained. This relationship is similar to the above-described relationship between the image information and the reading resolution. That is, one piece of record data corresponds to one pixel on a recording sheet.

Normally, if the recording density is high, a beautiful recorded image can be formed with fine details. However, an increase in recording density increases the amount of record data, and increases the time consumed by the inkjet printer unit 37 for the recording operation. Conversely, if the recording density is reduced, details of the entire image read are not formed, that is, image quality deteriorates, but the memory capacity needed to store image information and the time needed for the recording operation decrease.

The recording density in the sub-scanning direction is determined in accordance with the relationship between the amount of recording sheet conveyance to the recording position in the sub-scanning direction and the recording timing of the inkjet printer unit 37. That is, if 300 recording pixels are provided for every inch, the inkjet printer unit 37 performs recording every time the recording sheet is conveyed a distance equal to a three-hundredth of 1 inch (about 0.08 mm). If 200 recording pixels are provided for every inch, the inkjet printer unit 37 performs recording every time the recording sheet is conveyed a distance equal to a two-hundredth of 1 inch (about 0.12 mm). Thus, as the amount of recording sheet conveyance in the sub-scanning direction for recording decreases, the number of recording pixels per inch increases, that is, the recording density increases. As the amount of recording sheet conveyance in the sub-scanning direction for recording increases, the number of recording pixels per inch decreases, that is, the recording density decreases.

In this embodiment, the CPU 34 controls the rotation of the guide rollers 45, 46. Therefore, the recording density in the sub-scanning direction can be changed by the CPU 34 controlling the recording timing of the ink jet printer unit 37 while controlling the rotation of the guide rollers 45, 46.

The recording density in the main scanning direction is determined by the relationship between the amount of movement of the inkjet printer unit 37 in the main scanning direction (right-to-left directions relative to the device body 2) and the recording timing of the ink jet printer unit 37, which is similar to the relationship between the amount of recording sheet conveyance in the sub-scanning direction and the recording timing. That is, as the amount of movement of the inkjet printer unit 37 in the main scanning direction for recording operation decreases, the number of recording pixels per inch increases, that is, the recording density increases. As the amount of movement of the ink jet printer unit 37 in the main scanning direction for recording operation increases, the number of recording pixels per inch decreases, that is, the recording density decreases.

Therefore, through the above-described control, the recording density in the main scanning direction and the sub-scanning direction can be changed. For example, the recording density of 360×720 pixels (the number of pixels in the main scanning direction×the number of pixels in the sub-scanning direction) per square inch is higher than the recording density of 360×360 pixels (the number of pixels in the main scanning direction×the number of pixels in the sub-scanning direction) per square inch.

Figure 4:
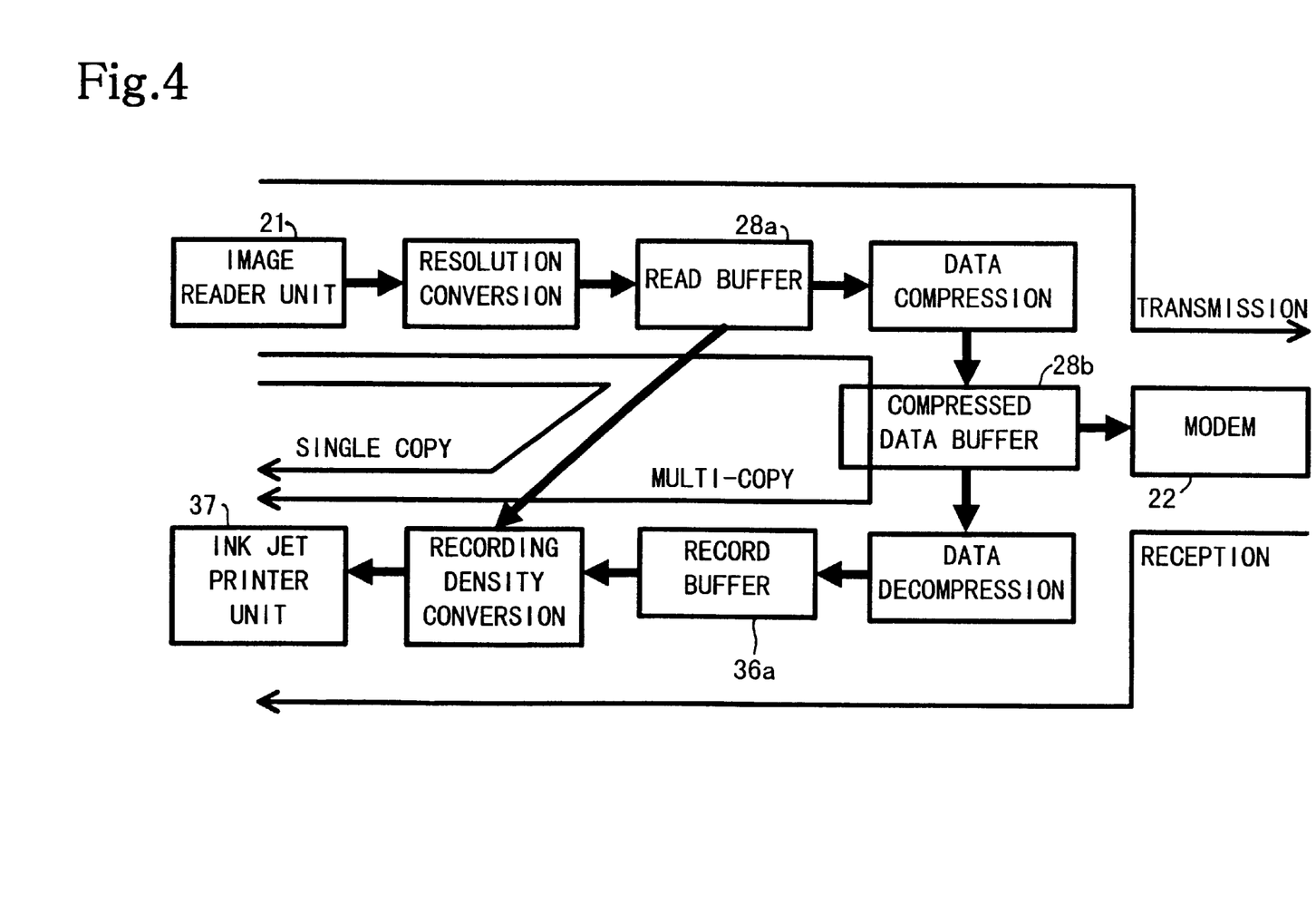
FIG. 4 is an exemplary schematic illustration of the flow of image information in the multi-function device.

The signal flow in the device 1 constructed as describe above will be described with reference to FIG. 4. FIG. 4 is an exemplary schematic illustration of the signal flow in the device 1.

The reading resolution of the image information read by the image reader unit 21 can be changed by the CPU 26 in the above-described manner. The image information is stored into a read buffer 28a provided in the RAM 28. The flow of image information signals changes depending on which one of the multi-copy mode and the signal copy mode is to be set at the time of output of the image information from the read buffer 28a performed by the CPU 26.

That is, if the signal copy mode is selected, the CPU 34, after receiving the image information outputted from the read buffer 28a by the CPU 26, suitably changes the recording density of the image information, and supplies it to the ink jet printer unit 37. Therefore, the inkjet printer unit 37 can record the image information onto a recording sheet at the recording density set by the printer section 30. Since the reading operation of the image reader unit 21 and the recording operation of the ink jet printer unit 37 are performed simultaneously, the amount of image information stored into the read buffer 28a is reduced.

If the multi-copy mode is selected, the CPU 26 performs data compression of the image information from the read buffer 28a at the time of output from the read buffer 28a, by using a data compression-decompression table (not shown) recorded in the ROM 27. The compressed image information is then stored into a compressed data buffer 28b provided in the RAM 28. To perform multi-copy, the device 1 decompresses the compressed data from the compressed data buffer 28b by using the data compression-decompression table, and then stores the decompressed data into a record buffer 36a provided in the RAM 36. After that, the CPU 34 suitably changes the recording density of the image information outputted from the record buffer 36a, and supplies it to the ink jet printer unit 37. Therefore, the inkjet printer unit 37 can record the image information onto a recording sheet at the recording density set by the CPU 34.

During the multi-copy operation, the CPU 26 compresses the whole image information of one page read by the image reader unit 21 before storing it into the compressed data buffer 28b. This data compressing operation is performed in order to minimize the memory capacity needed to store the image information for efficient storage. Various methods can be employed to determine which one of the multi-copy mode and the single copy mode is selected. For example, the selected copy mode may be determined by determining whether a user has instructed one copy or a plurality of copies by using the keys in the operating panel 3. Other mode determining methods are also possible.

In the case of facsimile transmission from the device 1, the flow of image information until the compressed data is stored into the compressed data buffer 28b is substantially the same as that in the multi-copy mode, but the image information flow that follows is different from that in the multi-copy mode. That is, for facsimile transmission, the compressed data outputted from the compressed data buffer 28b is coded by the modem 22, and then transmitted to the facsimile A1 via the NCU 24.

In the case of facsimile reception by the device 1, the image information received from the facsimile A1 via the NCU 24 is decoded by the modem 22, and stored into the compressed data buffer 28b. For the subsequent recording of the received facsimile information, the CPU 34 decompresses the compressed data stored in the compressed data buffer 28b by using the data compression-decompression table, and stores the decompressed data into the record buffer 36a provided in the RAM 36. Then, the image information is output from the record buffer 36a, and the recording density of the image information is suitably changed by the CPU 34. Subsequently, the CPU 34 sends the image information to the ink jet printer unit 37, so that the ink jet printer unit 37 records the image information onto a recording sheet.

Figure 5:
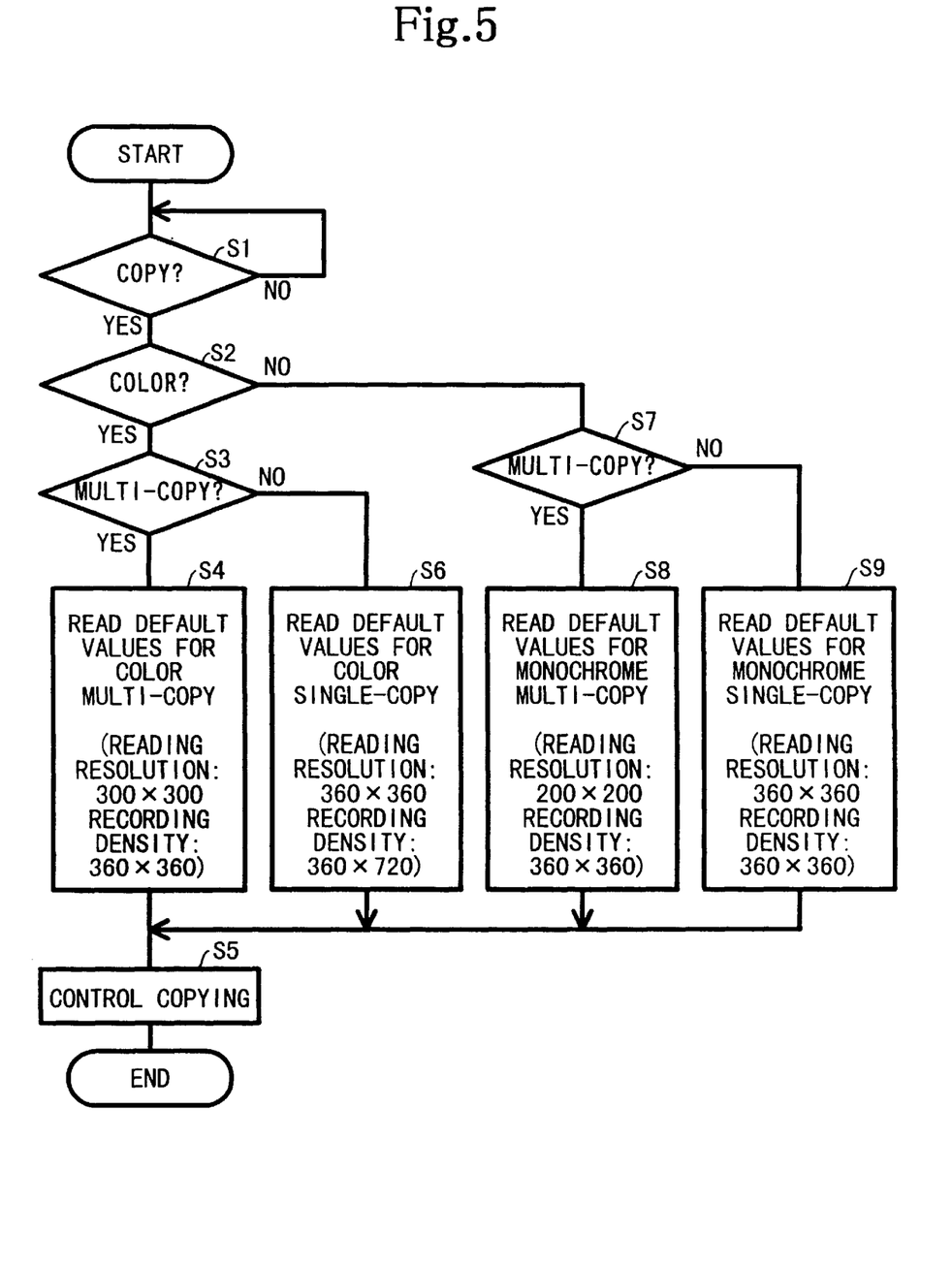
FIG. 5 is an exemplary flowchart outlining an operation of the multi-function device.

The copy operation of the above-described device 1 will be described with reference to FIG. 5. FIG. 5 is an exemplary flowchart outlining a program for the copy operation.

Referring to FIG. 1, it is determined in step S1 whether either one of the copy buttons 8 has been depressed. If neither copy button 8 has been depressed (NO in step S1), the CPUs 26, 34 wait until either one of the copy buttons 8 is depressed. When one of the copy buttons 8 is depressed (YES in step S1), the CPUs 26, 34 determine in step S2 which one of color reading and monochrome reading to perform. The CPUs 26, 34 may determine which one of color data or monochrome data to read from a document, by detecting which one of the monochrome copy button 8a and the color copy button 8b has been depressed.

If it is determined in step S2 that color copy is to be performed (YES in step S2), the CPUs 26, 34 determine in step S3 which one of the multi-copy mode and the single copy mode to select. The CPUs 26, 34 may determine which one of the multi-copy mode and the single copy mode to select, on the basis of the number of copies instructed by a user using one or more numerical keys 7, that is, whether the instructed number of copies is one or plural.

If it is determined in step S3 that the operation is to be performed in the multi-copy mode (YES in step S3), the CPUs 26, 34 extract default values for color multi-copy from the ROMs 27, 35 in step S4, and thereby controls the copy operation in step S5. Under the copy control, the device 1 feeds a document from the document setting portion 4 by using the document separating roller 12, and feeds a recording sheet from the sheet cassette, and reads image information from the document, and copies the read image information onto the recording sheet.

In this case, the CPUs 26, 34 perform the copy operation by using the color multi-copy default values. More specifically, image information is read from a document at a reading resolution of, for example, 300×300 pixels (the number of pixels in the main scanning direction×the number of pixels in the sub-scanning direction) per square inch, and the image information is recorded at a recording density of, for example, 360×360 pixels (the number of pixels in the main scanning direction×the number of pixels in the sub-scanning direction) per square inch.

If it is determined in step S3 that the operation is not to be performed in the multi-copy mode (NO in step S3), that is, if it is determined in step S3 that the operation is to be performed in the color single copy mode, the CPUs 26, 34 extract the default values for color single copy from the ROMs 27, 35 in step S6, and thereby controls the copy operation in step S5. Under the copy control, the device 1 reads image information from a document at a reading resolution of, for example, 360×360 pixels (the number of pixels in the main scanning direction×the number of pixels in the sub-scanning direction) per square inch, and records the image information at a recording density of, for example, 360×720 pixels (the number of pixels in the main scanning direction×the number of pixels in the sub-scanning direction) per square inch. Thus, the reading resolution and the recording density are higher in the color single copy mode than in the color multi-copy mode.

Thus, the different default values are used for the color multi-copy mode and the color single copy mode (reading resolution of 300×300 and recording density of 360×360 for color multi-copy, and reading resolution of 360×360 and recording density of 360×720 for color single copy). Therefore, in the color multi-copy mode, the reading resolution is reduced, so that the memory capacity needed to store image information and the time consumed for the reading operation are reduced. In the color single copy mode, on the other hand, the reading resolution is increased, so that the memory capacity needed to store image information and the time consumed for the reading operation are increased. Furthermore, the set recording density is higher in the color single copy mode than in the color multi-copy mode. This recording density setting is favorable because a user, when selecting the color single copy mode, normally desires a high recording density despite a long recording time.

In contrast to the case where the color single copy mode is selected, if the color multi-copy mode is selected by a user, a reduced memory capacity used to store image information and a reduced length of time consumed to read and record the image information more suitably serve the convenience of the user, despite certain reductions in reading resolution and recording density. Considering this, the color multi-copy mode default values are determined.

In the device 1 according to the embodiment, the CPUs 26, 34 extract suitable default values in accordance with, for example, the color multi-copy mode or the color single copy mode selected, and thereby automatically determine a reading resolution and a recording density suitable for the selected mode. Therefore, the user does not need to operate manual keys or the like to change the reading resolution, the recording density or the like. After a reading resolution and a recording density are automatically set by the device 1, the user is allowed to change the reading resolution and the recording density and the like by operating the manual keys or the like if necessary.

The flowchart of FIG. 5 will be further described. If it is determined in step S2 that color copy is not to be performed (NO in step S2), the CPUs 26, 34 determine in step S7 which one of the multi-copy mode and the single copy mode to select. If it is determined in step 7 that the operation is to be performed in the multi-copy mode (YES in step S7), the CPUs 26, 34 extract the default values for monochrome multi-copy from the ROMs 27, 35 in step S8, and thereby controls the copy operation in step S5. Under the copy control, the CPUs 26, 34 performs the copy operation by using the monochrome multi-copy default values. The device 1 reads image information from a document at a reading resolution of, for example, 200×200 pixels (the number of pixels in the main scanning direction×the number of pixels in the sub-scanning direction) per square inch, and records the image information at a recording density of, for example, 360×360 pixels (the number of pixels in the main scanning direction×the number of pixels in the sub-scanning direction) per square inch.

Conversely, if it is determined in step S7 that the operation is not to be performed in the multi-copy mode (NO in step S7), the CPUs 26, 34 extract the default values for monochrome single copy from the ROMs 27, 35 in step S9, and thereby controls the copy operation in step S5. Under the copy control, the device 1 reads image information from a document at a reading resolution of, for example, 360×360 pixels (the number of pixels in the main scanning direction× the number of pixels in the sub-scanning direction) per square inch, and records the image information at a recording density of, for example, 360×360 pixels (the number of pixels in the main scanning direction×the number of pixels in the sub-scanning direction) per square inch. Thus, the reading resolution is higher in the monochrome single copy mode than in the monochrome multi-copy mode.

Thus, the different default values are used for the monochrome multi-copy mode and the monochrome single copy mode (reading resolution of 200×200 and recording density of 360×360 for monochrome multi-copy, and reading resolution of 360×360 and recording density of 360×360 for monochrome single copy). In the monochrome multi-copy mode, the reading resolution is reduced, so that the memory capacity needed to store image information and the time consumed for the reading operation are reduced. In the monochrome single copy mode, on the other hand, the reading resolution is increased, so that the memory capacity needed to store image information and the time consumed for the reading operation are increased. If the monochrome multi-copy mode is selected by a user, a reduced memory capacity used to store image information and a reduced length of time consumed to read the image information more suitably serve the convenience of the user, despite a certain reduction in reading resolution, in contrast to the case where the monochrome single copy mode is selected. Considering this, the relatively low reading resolution is present for the monochrome multi-copy mode. For the monochrome copy modes, the default values for multi-copy and single copy define the same recording density.

Furthermore, the different default values are used for the color multi-copy mode and the monochrome multi-copy mode (reading resolution of 300×300 and recording density of 360×360 for color multi-copy, and reading resolution of 200×200 and recording density of 360×360 for monochrome multi-copy). In the color multi-copy mode, the reading resolution is relatively reduced, so that the memory capacity needed to store image information and the time consumed for the reading operation are reduced. In the monochrome multi-copy mode, on the other hand, the reading resolution is relatively increased, so that the memory capacity needed to store image information and the time consumed for the reading operation are increased. If the monochrome multi-copy mode is selected by a user, a reduced memory capacity used to store image information and a reduced length of time consumed to read the image information more suitably serve the convenience of the user, despite a certain reduction in reading resolution. Considering this, the relatively low reading resolution is present for the monochrome multi-copy mode. The default values for the color multi-copy mode and the monochrome multi-copy mode define the same recording density.

Further, the different default values are used for the color single copy mode and the monochrome single copy mode (reading resolution of 360×360 and recording density of 360×720 for color single copy, and reading resolution of 360×360 and recording density of 360×360 for monochrome single copy). In the color single copy mode, the recording density is relatively increased. In the monochrome single copy mode, on the other hand, the recording density is relatively reduced. If the monochrome single copy mode is selected by a user, a reduced length of time consumed for the recording operation more suitably serves the convenience of the user, despite a certain reduction in recording density. Considering this, the relatively low recording density is present for the monochrome single copy mode. The default values for the color single copy mode and the monochrome single copy mode define the same reading resolution.

The aforementioned values of reading resolution and recording density per square inch are merely illustrative, and may be changed in any manner. The default values of reading resolution and recording density read in steps S4, S6, S8, S9 constitute the default values for color data, the default values for monochrome data, the default values for multi-copy and the default values for single copy, and may be termed "first default value" and "second default value".

According to the embodiment, the device 1 (copying apparatus) for reading image information from a document conveyed and copying the read image information onto a recording sheet (recording medium) includes the CPUs 26, 34 (first determining device) for determining whether the image information is to be read as color data or monochrome data, the CPUs 26, 34 (second determining device) for determining which one of the multi-copy mode and the single copy mode to select, the ROMs 27, 35 (storage device) storing first and second default values that provide varying recording densities for copying the image information onto the recording sheet (recording medium) in accordance with the result of determination made by the CPUs 26, 34 (first and second determining devices), and the CPUs 26, 34 (control device) for changing the recording density used to copy the image information onto the recording sheet (recording medium) on the basis of the first and second default values stored in the ROMs 27, 35.

Therefore, the device 1 automatically sets a suitable recording density on the basis of, for example, whether to read image information from a document as color data or monochrome data, or which one of the multi-copy mode and the single copy mode is selected.

As a result, it becomes unnecessary for a user to change the recording density or the like by operating a manual key or the like. Thus, the device 1 eliminates the need for a user to perform a cumbersome manual procedure to change the recording density or the like. The CPUs 26, 34 constitute the control device for varying the recording density used to copy image information onto a recording medium, by extracting a suitable default value from the ROMs 27, 35, and the first determining device for determining whether the image information is to be read as color data or monochrome data, and the second determining device for determining which one of the single copy mode and the multi-copy mode to select.

The device 1 can also be used to perform functions other than the copy function or mode, for example, the functions of a reading apparatus. For such functions, the device 1 determines whether to read image information as color data or monochrome data, or determines which one of the multi-document reading mode and the single document reading mode to select. An example of the operation for the reading apparatus functions can be described by using a flowchart similar to the flowchart of FIG. 5, wherein "COPY" in step S1 is changed into "READING", and "MULTI-COPY" in steps S3, S7 is changed into "MULTI-READING", and only the default values of "READING RESOLUTION" are read in steps S4, S6, S8, S9, and "CONTROL COPYING" is changed into "CONTROL READING".

In this operation, the default values of reading resolution read in steps S4, S6, S8, S9 constitute the default values for color data, the default values for monochrome data, the default values for multi-document reading and the default values for single document reading, and may be termed "third default value" and "fourth default value"

For the aforementioned reading operation, the CPU 26 constitutes a control device for varying the reading resolution in reading image information by extracting a suitable one of the aforementioned default values, and constitutes a first read determining device for determining whether the image information is to be read as color data or monochrome data, and constitutes a second read determining device for determining which one of the multi-document reading mode and the single document reading mode to select.

Therefore, for the reading function, the device 1 according to the embodiment includes the CPU 26 (first read determining device) for determining whether image information is to be read as color data or monochrome data, the CPU 26 (second read determining device) for determining which one of the multi-document reading mode and the single document reading mode to select, the ROM 27 (storage device) storing third and fourth default values that provide varying reading resolutions for reading the image information in accordance with the result of determination made by the CPU 26 (first and second read determining devices), and the CPU 26 (control device) for changing the reading resolution used to read the image information on the basis of the third and fourth default values stored in the ROM 27. The determination as to which one of the multi-document reading mode and the single document reading mode to select may be accomplished, for example, by determining whether a user has instructed the reading of a single document or a plurality of documents by using a key provided in the operating panel 3. The determination as to whether to read image information as color data or monochrome data may be accomplished, for example, by detecting whether the color instruction key 7b has been depressed.

The device 1 can also be used to perform functions other than the copy function or mode, for example, the functions of a recording apparatus. For such functions, the device 1 determines whether record data is to be recorded as color data or monochrome data, or determines which one of the multi-recording mode and the single recording mode to select, similarly to the case of the copying or reading functions described above. An example of the operation for the recording apparatus functions can be described by using a flowchart similar to the flowchart of FIG. 5, wherein "COPY" in step S1 is changed into "RECORDING", and "MULTI-COPY" in steps S3, S7 is changed into "MULTI-RECORDING", and only the default values of "RECORDING DENSITY" are read in steps S4, S6, S8, S9, and "CONTROL COPYING" is changed into "CONTROL RECORDING".

In this operation, the default values of recording density read in steps S4, S6, S8, S9 constitute the default values for color data, the default values for monochrome data, the default values for multi-recording and the default values for single recording, and may be termed "fifth default value" and "sixth default value"For this operation, therefore, the CPU 34 constitutes a control device for varying the recording density for recording record data by extracting a suitable one of the aforementioned default values, and constitutes a first record determining device for determining whether record data received is color data or monochrome data, and constitutes a second record determining device for determining which one of the multi-recording mode and the single recording mode to select.

The device 1 may also have an arrangement wherein the recording density is changed in accordance with the types of facsimile-received data, that is, whether the facsimile-received data is monochrome or color, or of a single page or multiple pages. The operation of the arrangement may be described by a flowchart similar to the flowchart of FIG. 5, wherein "COPY" in step S1 is changed into "FACSIMILE-RECEIVED DATA", and "MULTI-COPY" in steps S3, S7 is changed into "FACSIMILE-RECEIVED DATA FOR MULTI-RECORDING", and only the default values of "READING RESOLUTION" are read in steps S4, S6, S8, S9, and "CONTROL COPYING" is changed into "CONTROL FACSIMILE RECEPTION".

For this operation, the facsimile-received data needs to include indication data indicating whether the facsimile data is for single-page recording or multi-page recording, and indication data indicating whether the facsimile data is color data or monochrome data. It is also necessary that the multi-function device 1 be designed to detect the indication data.

The device 1 of the embodiment is capable of recording record data onto a recording sheet (recording medium) by using the ink jet printer unit 37 (recorder unit), as described above. This means that the device 1 has a construction including the CPU 34 (first record determining device) for determining whether record data is color data or monochrome data, the CPU 34 (second record determining device) for determining which one of the multi-recording mode and the single recording mode to select, the ROM 35 (storage device) storing fifth and sixth default values that provide varying recording densities for recording the record data in accordance with the result of determination made by the CPU 34 (first and second record determining devices), and the CPU 34 (control device) for changing the recording density used to record the record data on the basis of the fifth and sixth default values stored in the ROM 35. The determination as to which one of the multi-recording mode and the single recording mode to select may be accomplished, for example, by determining whether a user has instructed a single page for recording or a plurality of pages for recording by using a key provided in the operating panel 3.

It is to be understood that the invention is not restricted to the particular forms shown in the foregoing embodiment.

Various modifications and alternations can be made thereto without departing from the scope of the invention. For example, the invention is also applicable to copying apparatuses, reading apparatuses, recording apparatuses which are not provided in the form of a multi-function device as described above. The reader unit may also include a device other than a CCD unit as described above. The recording medium may also be a medium other than a recording sheet. The aforementioned default values stored in the storage device are merely illustrative, and may be changed in any manner.

What is claimed is:

1. A copying apparatus for reading image information from a document and copying the image information onto a recording sheet, comprising:

a first determining device that determines whether the image information is to be read as color data or monochrome data;

a storage device that stores a first default value for varying a recording density for copying the image information onto the recording medium in accordance with a result of determination made by the first determining device; and a control device that changes the recording density used to copy the image information onto the recording medium on the basis of the first default value stored in the storage device.

2. The copying apparatus of claim 1, wherein the first default value includes a default value for color data and a default value for monochrome data, and the control device uses the default value for color data to perform copying at a high recording density, and uses the default value for monochrome data to perform copying at a low recording density.

3. The copying apparatus of claim 1, further comprising a second determining device that determines whether a multi-copy mode or a single copy mode is selected, wherein the storage device stores a second default value for varying a recording density for copying the image information onto the recording medium in accordance with a result of determination made by the second determining device, and wherein the control device changes the recording density used to copy the image information onto the recording medium on the basis of the second default value stored in the storage device.

4. The copying apparatus of claim 3, wherein the second default value includes a default value for multi-copy and a default value for single copy, and the control device uses the default value for single copy to perform copying at a high recording density, and uses the default value for multi-copy to perform copying at a low recording density.

5. A reading apparatus for reading image information from a document at a reading resolution, comprising:

a first read determining device that determines whether the image information is to be read as color data or monochrome data;

a storage device that stores a first default value for varying a reading resolution for reading the image information in accordance with a result of determination made by the first read determining device; and a control device that changes the reading resolution used to read the image information on the basis of the first default value stored in the storage device, wherein the first default value includes a default value for color data and a default value for monochrome data, and the control device uses the default value for color data to read at a high reading resolution, and uses the default value for monochrome data to read at a low reading resolution.

6. The reading apparatus of claim 5, further comprising a second read determining device that determines whether a multi-reading mode or a single reading mode is selected, wherein the storage device stores a second default value for varying a reading resolution for reading the image information in accordance with a result of determination made by the second read determining device, and wherein the control device changes the reading resolution used to read the image information on the basis of the second default value stored in the storage device.

7. The reading apparatus of claim 6, wherein the second default value includes a default value for multi-reading and a default value for single reading, and the control device uses the default value for multi-reading to read at a low reading resolution, and uses the default value for single reading to read at a high reading resolution.

8. A recording apparatus for recording record data onto a recording sheet at a recording density, comprising:

a first record determining device that determines whether the record data is color data or monochrome data;

a storage device that stores a first default value for varying a recording density for recording the record data in accordance with a result of determination made by the first record determining device; and a control device that changes the recording density used to record the record data on the basis of the first default value stored in the storage device.

9. The recording apparatus of claim 8, wherein the first default value includes a default value for color data and a default value for monochrome data, and the control device uses the default value for color data to record the record data at a high recording density, and uses the default value for monochrome data to record the record data at a low recording density.

10. The recording apparatus of claim 8, further comprising a second record determining device that determines whether a multi-recording mode or a single recording mode is to be selected, wherein the storage device stores a second default value for varying a recording density for recording the record data in accordance with a result of determination made by the second record determining device, and wherein the control device that changes the recording density used to record the record data, on the basis of the second default value stored in the storage device.

11. The recording apparatus of claim 10, wherein the second default value includes a default value for multi-recording and a default value for single recording, and the control device uses the default value for single recording to record the record data at a high recording density, and uses the default value for multi-recording to record the record data at a low recording density.

12. An imaging apparatus, comprising:

a determining device that determines whether a first mode or a second mode is selected;

a storage device that stores a default value for varying an imaging parameter in accordance with a result of determination made by the determining device, and a control device that changes the imaging parameter on the basis of the default value stored in the storage device, wherein the default value includes at least a default value for reading in a multi-copy mode.

13. The imaging apparatus of claim 12, wherein the default value further includes one or more of a default value for copying color data, a default value for copying monochrome data, a default value for copying in a multi-copy mode, a default value for copying in a single copy mode, a default value for reading color data, a default value for reading monochrome data, a default value for reading in a single copy mode, a default value for recording color data, a default value for recording monochrome data, a default value for recording in a multi-copy mode, and a default value for recording in a single copy mode.

14. The imaging apparatus of claim 12, wherein the imaging parameter is at least one of a recording density and a reading resolution.

15. An imaging method, comprising:
   determining whether a first mode or a second mode is selected;
   retrieving a default value from a storage device based on a result of determination made by the determining device; and
   controlling an imaging parameter on the basis of the retrieved default values,
   wherein the default value includes at least a default value for reading in a multi-copy mode.

16. The imaging method of claim 15, wherein the default value further includes one or more of a default value for copying color data, a default value for copying monochrome data, a default value for copying in a multi-copy mode, a default value for copying in a single copy mode, a default value for reading color data, a default value for reading monochrome data, a default value for reading in a single copy mode, a default value for recording color data, a default value for recording monochrome data, a default value for recording in a multi-copy mode, and a default value for recording in a single copy mode.

17. The imaging method of claim 15, wherein the imaging parameter is at least one of a recording density and a reading resolution.

18. A multifunction apparatus for reading, copying and recording image information, comprising:
   a first determining device that determines whether the image information is to be read as color data or monochrome data;
   a second determining device that determines whether a multi-sheet mode or a single sheet mode is selected;
   a storage device that stores a first default value for varying a recording density or reading resolution of the image information in accordance with a result of determination made by the first determining device and a second default value for varying a recording density or reading resolution of the image information in accordance with a result of determination made by the second determining device; and
   a control device that changes the recording density or reading resolution of the image information based on either the first default value, the second default value, or both the first default value and the second default value stored in the storage device.

19. The multifunction apparatus of claim 18, wherein the first default value includes a default value for color data and a default value for monochrome data, and the control device uses the default value for color data to perform copying at a high recording density, and uses the default value for monochrome data to perform copying at a low recording density.

20. The multifunction apparatus of claim 18, wherein the second default value includes a default value for a multi-sheet mode and a default value for a single sheet mode, and the control device uses the default value for single sheet mode to perform copying at a high recording density, and uses the default value for multi-sheet mode to perform copying at a low recording density.

* * * * *